Patented Dec. 17, 1929

1,739,491

UNITED STATES PATENT OFFICE

CARLOS ERNESTO BAHRE, OF BUENOS AIRES, ARGENTINA

NEW PROCESS FOR UTILIZING STEM FIBERS

No Drawing.   Application filed December 9, 1927. Serial No. 238,846.

The object of this invention is the provision of a simple practical, economical process for treating raw plant fiber to transform it into fleecy, shiny and durable spinning material.

It is known that plant fibers can be improved by a treatment with caustic potash or soda, hot or cold, under normal or high pressure.

The object of this treatment is the loosening of incrustant substances from the fibers, whereby they are freed.

To accomplish this, a concentrated solution of caustic potash or soda must be used, and as a consequence the quality of the fiber is more or less impaired, being rendered brittle.

It has been the custom, therefore, to modify this treatment, by adding to the caustic an oil emulsion to neutralize the alkali and replace to a certain extent, the oils removed from the fibers by the caustic, thereby restoring the flexibility of the fibers.

But this treatment is not very practicable and does not restore to the fibers their natural flexibility. These oil emulsions do not guarantee very much protection from the caustic, because if a small quantity of oil is used its influence is negatived by reason of its being saponified, and if a large quantity is used the action of the caustic is impaired by saponification to a point, where it will not disintegrate the plant structure.

After many years of experimentation, it has been found that if cholesterin, either in a free state or mixed with other substances, be mixed with caustic bath, no saponification takes place, the caustic action is not diminished and the fiber retains its natural condition after treatment.

The cholesterin moreover, because of its strong protective quality, permits the use of much stronger caustic and higher temperature than was hitherto permissible. For this reason the time of disintegration can be considerably reduced.

It has also been found that cholesterin exerts its protective properties when the disintegration is effected with strong ammoniacal solutions or alkaline carbonates, both of which are very efficient for this purpose.

A further advantage of the use of cholesterin has in the fact that, because it does not saponify, it can be used repeatedly without any need for renewal. This renders the process highly economical.

The cholesterin may be added, as such, or substances containing it, such as fish oil, egg yolk or egg oil, may be used. In the following example, the quantities of materials used are merely illustrative and are not to be taken as necessary limitations.

Example

The raw material is introduced into an autoclave, sprayed with a strong caustic solution containing 10 grams of cholesterin per liter, and cooked in this solution for 12 hours at a pressure of 8 atmospheres.

The concentration of the disintegrating solution and the conditions of working vary with the type of raw material treated, and the disintegrating solution used.

The disintegrated raw material is removed from the bath, washed till the caustic is completely removed and dried at a low temperature preferably in vacuum.

The resulting product has unlimited durability and is valuable as a spinning material, being capable of immediate utilization.

Having thus described the invention and the manner in which it is to be performed, what is claimed as new and desired to be secured by Letters Patent is:

1. The process of disintegrating fibrous material which comprises treating it with a strongly alkaline solution containing cholesterin.

2. The process of disintegrating fibrous material which comprises treating it with a strongly alkaline solution containing a substance selected from the group consisting of fish oil, egg yolk and egg oil.

3. The process of disintegrating fibrous material which comprises boiling it with a strongly alkaline solution containing cholesterin.

4. The process of disintegrating fibrous material which comprises boiling it with a strongly alkaline solution containing a substance selected from the group consisting of fish oil, egg yolk and egg oil.

5. The process of disintegrating fibrous material which comprises boiling it under a high pressure, with a concentrated caustic solution containing a substance selected from the group consisting of fish oil, egg yolk and egg oil.

CARLOS ERNESTO BAHRE.